US011748031B2

(12) United States Patent
LeCrone et al.

(10) Patent No.: US 11,748,031 B2
(45) Date of Patent: Sep. 5, 2023

(54) RUNNING AN INDEPENDENT TASK IN CONNECTION WITH SYNCHRONOUS I/O OPERATIONS

(71) Applicant: EMC IP Holding Company LLC, Hopkinton, MA (US)

(72) Inventors: Douglas E. LeCrone, Hopkinton, MA (US); Paul A. Linstead, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 171 days.

(21) Appl. No.: 17/234,380

(22) Filed: Apr. 19, 2021

(65) Prior Publication Data

US 2022/0334766 A1 Oct. 20, 2022

(51) Int. Cl.
*G06F 3/06* (2006.01)

(52) U.S. Cl.
CPC ............ *G06F 3/0659* (2013.01); *G06F 3/067* (2013.01); *G06F 3/0613* (2013.01); *G06F 3/0653* (2013.01)

(58) Field of Classification Search
CPC .... G06F 3/0659; G06F 3/0613; G06F 3/0653; G06F 3/067
See application file for complete search history.

(56) References Cited

U.S. PATENT DOCUMENTS

| | | | | |
|---|---|---|---|---|
| 7,650,533 B1 * | 1/2010 | Saxena | ............... | G06F 11/1464 714/13 |
| 9,672,099 B2 * | 6/2017 | Craddock | ........... | G06F 11/0766 |
| 10,210,131 B2 * | 2/2019 | Craddock | ........... | G06F 12/0862 |
| 10,592,447 B1 * | 3/2020 | Danilov | .................. | G06F 13/20 |

* cited by examiner

*Primary Examiner* — Farley Abad
*Assistant Examiner* — Richard B Franklin
(74) *Attorney, Agent, or Firm* — Muirhead and Saturnelli, LLC

(57) ABSTRACT

Running an independent task in connection with a synchronous I/O operation between a storage system and a host includes starting the synchronous I/O operation, setting a timer for the synchronous I/O operation, starting the independent task that runs while waiting for completion of the synchronous I/O operation, and aborting the synchronous I/O operation in response to the timer expiring prior to completion of the synchronous I/O operation. The independent task may be ended in response to the timer expiring. The independent task may be ended in response to the I/O operation completing. The synchronous I/O operation may be performed using a high speed connection between the storage system and the host, which may be coupled to a smart network interface controller provided on a director board in the storage system. The smart network interface controller may include a system on a chip having a processor, memory, and non-volatile storage.

21 Claims, 5 Drawing Sheets

RUNNING AN INDEPENDENT TASK IN CONNECTION WITH SYNCHRONOUS I/O OPERATIONS

TECHNICAL FIELD

This application relates to the field of computer systems and storage systems therefor and, more particularly, to the field of synchronous high speed I/O between computer systems and storage systems.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units. The logical disk units may or may not correspond to any one of the actual disk drives. Allowing multiple host systems to access the single storage system allows the host systems to share data stored therein.

In some instances, high speed synchronous I/O operations may be performed between a host and a storage system. The high speed synchronous I/O operations are facilitated by a special high speed connection between the host and the storage system and by special components that directly access cache memory data of the storage system for I/O operations with the host. Having the I/O operation be synchronous provides efficiencies by avoiding significant overhead associated with asynchronous operations. Moreover, if successful, the time for a high speed synchronous I/O operation is far less than the time that would be used to schedule an asynchronous I/O task, swap to one or more other tasks, and then swap back to the asynchronous I/O task. However, a downside to having the high speed I/O operation be synchronous is that the CPU is idle or otherwise not being used for other work while the system waits for a result of initiating the synchronous I/O operation.

Accordingly, it is desirable to provide synchronous I/O operations in a way that minimizes CPU idle time.

SUMMARY OF THE INVENTION

According to the system described herein, running an independent task in connection with a synchronous I/O operation between a storage system and a host includes starting the synchronous I/O operation, setting a timer for the synchronous I/O operation, starting the independent task that runs while waiting for completion of the synchronous I/O operation, and aborting the synchronous I/O operation in response to the timer expiring prior to completion of the synchronous I/O operation. The independent task may be ended in response to the timer expiring. The independent task may be ended in response to the I/O operation completing. The synchronous I/O operation may be performed using a high speed connection between the storage system and the host. The high speed connection may be coupled to a smart network interface controller provided on a director board in the storage system. The smart network interface controller may include a system on a chip having a processor, memory, and non-volatile storage. The smart network interface controller may be a LimeStoneDX SLIC running a PCI PEX8733 Draco chip from Broadcom Corporation of San Jose, Calif. Running an independent task in connection with a synchronous I/O operation between a storage system and a host may also include performing an asynchronous I/O operation using data that was used for the synchronous operation in response to the timer expiring prior to completion of the synchronous I/O operation. The asynchronous I/O operation may be performed using an alternative connection between the host and the storage system. The alternative connection may be a Fibre Channel connection.

According further to the system described herein, a non-transitory computer readable medium contains software that runs an independent task in connection with a synchronous I/O operation between a storage system and a host. The software includes executable code that starts the synchronous I/O operation, executable code that sets a timer for the synchronous I/O operation, executable code that starts the independent task that runs while waiting for completion of the synchronous I/O operation, and executable code that aborts the synchronous I/O operation in response to the timer expiring prior to completion of the synchronous I/O operation. The independent task may be ended in response to the timer expiring. The independent task may be ended in response to the I/O operation completing. The synchronous I/O operation may be performed using a high speed connection between the storage system and the host. The high speed connection may be coupled to a smart network interface controller provided on a director board in the storage system. The smart network interface controller may include a system on a chip having a processor, memory, and non-volatile storage. The smart network interface controller may be a LimeStoneDX SLIC running a PCI PEX8733 Draco chip from Broadcom Corporation of San Jose, Calif. The software may also include executable code that performs an asynchronous I/O operation using data that was used for the synchronous operation in response to the timer expiring prior to completion of the synchronous I/O operation. The asynchronous I/O operation may be performed using an alternative connection between the host and the storage system. The alternative connection may be a Fibre Channel connection.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein provides a mechanism to reduce CPU idle time during synchronous I/O operations. An independent task is initiated to run while the system is waiting for a result of the synchronous I/O operation.

Figure 1:
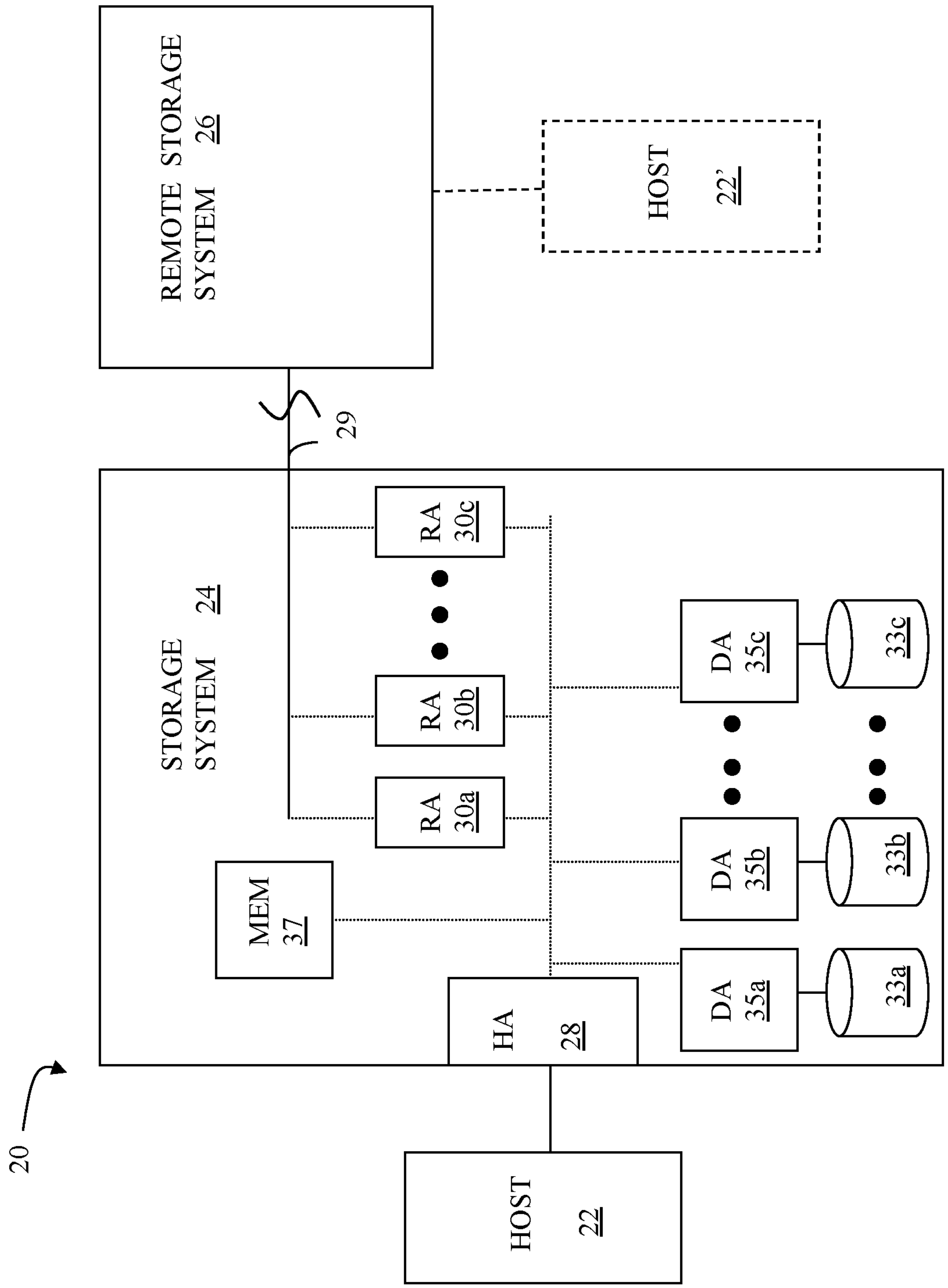
FIG. 1 is a schematic illustration showing a relationship between hosts and storage systems according to an embodiment of the system described herein.

FIG. 1 is a diagram 20 showing a relationship between a host 22 and a source storage system 24 that may be used in connection with an embodiment of the system described herein. In an embodiment, the source storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the source storage system 24 and may, in various embodiments, be coupled to the source storage system 24, using, for example, a network. The host 22 reads and writes data from and to the source storage system 24 via an HA 28 (host adapter), which facilitates an interface between the host 22 and the source storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the source storage system 24 may be copied to the remote storage system 26 via a link 29. For example, transferring data may be part of a data mirroring or replication process that causes data on the remote storage system 26 to be identical to the data on the remote storage system 24. Although only the one link 29 is shown, it is possible to have additional links between the storage systems 24, 26 and to have links between one or both of the storage systems 24, 26 and other storage systems (not shown). The source storage system 24 may include a first plurality of remote adapter units (RA's) 30*a*, 30*b*, 30*c*. The RA's 30*a*-30*c* may be coupled to the link 29 and be similar to the HA 28, but are used to transfer data between the storage systems 24, 26.

The source storage system 24 may include one or more physical storage units (including disks, solid state storage devices, etc.), each containing a different portion of data stored on the source storage system 24. FIG. 1 shows the source storage system 24 having a plurality of physical storage units 33*a*-33*c*. The source storage system 24 (and/or remote storage system 26) may be provided as a stand-alone device coupled to the host 22 as shown in FIG. 1 or, alternatively, the source storage system 24 (and/or remote storage system 26) may be part of a storage area network (SAN) that includes a plurality of other storage systems as well as routers, network connections, etc. (not shown in FIG. 1). The storage systems 24, 26 may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33*a*-33*c* may be coupled to a corresponding disk adapter unit (DA) 35*a*-35*c* that provides data to a corresponding one of the physical storage units 33*a*-33*c* and receives data from a corresponding one of the physical storage units 33*a*-33*c*. An internal data path exists between the DA's 35*a*-35*c*, the HA 28 and the RA's 30*a*-30*c* of the source storage system 24. Note that, in other embodiments, it is possible for more than one physical storage unit to be serviced by a DA and that it is possible for more than one DA to service a physical storage unit. The source storage system 24 may also include a global memory 37 that may be used to facilitate data transferred between the DA's 35*a*-35*c*, the HA 28 and the RA's 30*a*-30*c* as well as facilitate other operations. The memory 37 may contain task indicators that indicate tasks to be performed by one or more of the DA's 35*a*-35*c*, the HA 28 and/or the RA's 30*a*-30*c*, and may contain a cache for data fetched from one or more of the physical storage units 33*a*-33*c*.

The storage space in the source storage system 24 that corresponds to the physical storage units 33*a*-33*c* may be subdivided into a plurality of volumes or logical devices. The logical devices may or may not correspond to the storage space of the physical storage units 33*a*-33*c*. Thus, for example, the physical storage unit 33*a* may contain a plurality of logical devices or, alternatively, a single logical device could span both of the physical storage units 33*a*, 33*b*. Similarly, the storage space for the remote storage system 26 may be subdivided into a plurality of volumes or logical devices, where each of the logical devices may or may not correspond to one or more physical storage units of the remote storage system 26.

In some embodiments, another host 22' may be provided. The other host 22' is coupled to the remote storage system 26 and may be used for disaster recovery so that, upon failure at a site containing the host 22 and the source storage system 24, operation may resume at a remote site containing the remote storage system 26 and the other host 22'. In some cases, the host 22 may be directly coupled to the remote storage system 26, thus protecting from failure of the source storage system 24 without necessarily protecting from failure of the host 22.

Figure 2:
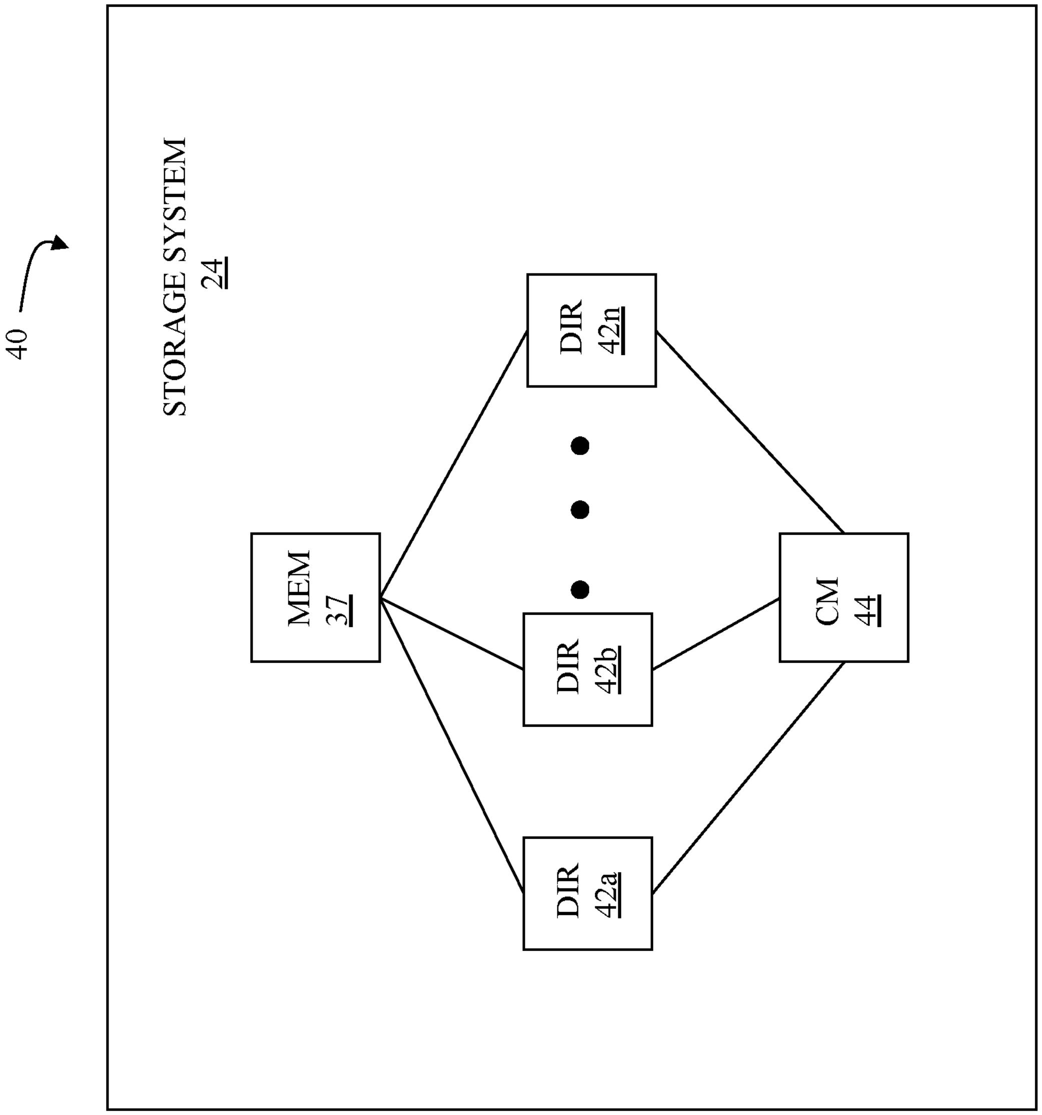
FIG. 2 is a schematic diagram illustrating a storage system where each of a plurality of directors are coupled to a memory according to an embodiment of the system described herein.

FIG. 2 is a schematic diagram 40 illustrating an embodiment of the source storage system 24 where each of a plurality of directors 42*a*-42*n* are coupled to the memory 37. Each of the directors 42*a*-42*n* represents at least one of the HA 28, RAs 30*a*-30*c*, or DAs 35*a*-35*c*. The diagram 40 also shows an optional communication module (CM) 44 that provides an alternative communication path between the directors 42*a*-42*n*. Each of the directors 42*a*-42*n* may be coupled to the CM 44 so that any one of the directors 42*a*-42*n* may send a message and/or data to any other one of the directors 42*a*-42*n* without needing to go through the memory 37. The CM 44 may be implemented using conventional MUX/router technology where one of the directors 42*a*-42*n* that is sending data provides an appropriate address to cause a message and/or data to be received by an intended one of the directors 42*a*-42*n* that is receiving the data. Some or all of the functionality of the CM 44 may be implemented using one or more of the directors 42*a*-42*n* so that, for example, the directors 42*a*-42*n* may be interconnected directly with the interconnection functionality being provided on each of the directors 42*a*-42*n*. In addition, one or more of the directors 42*a*-42*n* may be able to broadcast a message to all or at least some plurality of the other directors 42*a*-42*n* at the same time.

In some embodiments, one or more of the directors 42*a*-42*n* may have multiple processor systems thereon and thus may be able to perform functions for multiple discrete directors. In some embodiments, at least one of the directors 42*a*-42*n* having multiple processor systems thereon may simultaneously perform the functions of at least two different types of directors (e.g., an HA and a DA). Furthermore, in some embodiments, at least one of the directors 42*a*-42*n* having multiple processor systems thereon may simultaneously perform the functions of at least one type of director and perform other processing with the other processing system. In addition, all or at least part of the global memory 37 may be provided on one or more of the directors 42*a*-42*n* and shared with other ones of the directors 42*a*-42*n*. In an embodiment, the features discussed in connection with the source storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
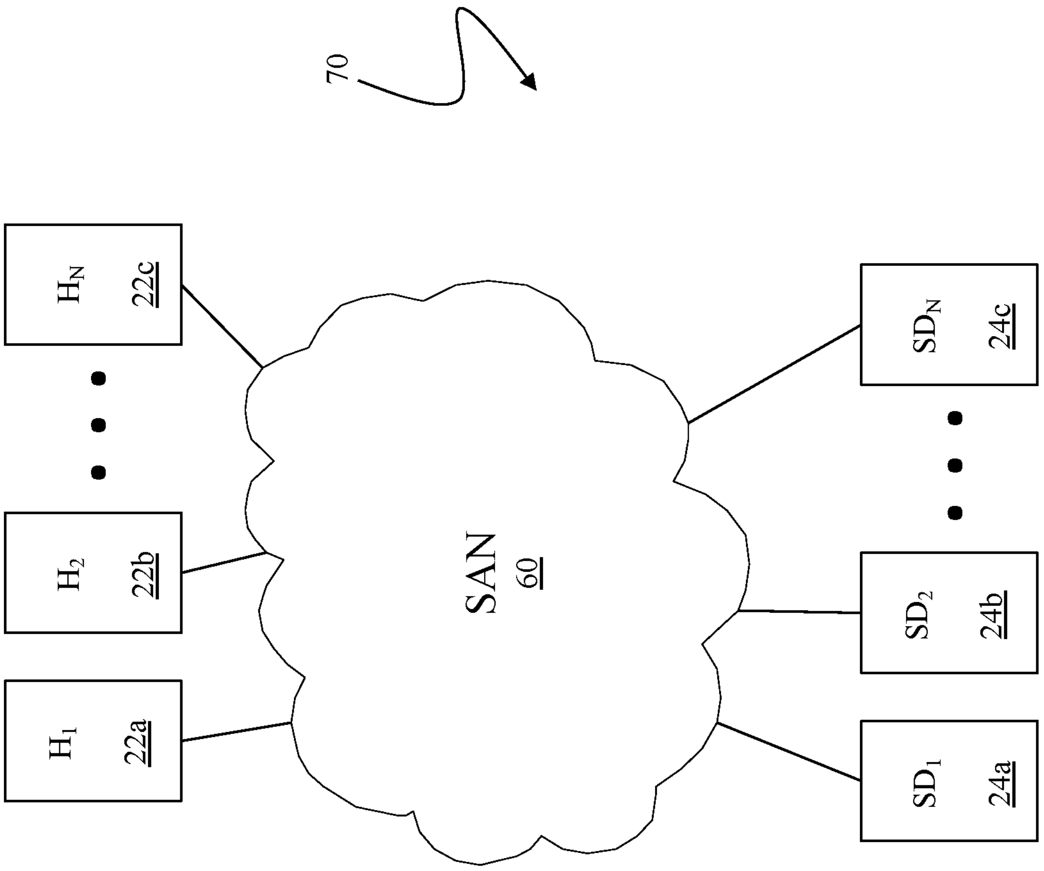
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22*a-c* to a plurality of storage systems ($SD_1$-$SD_N$) 24*a-c* that may be used in connection with an embodiment of the system described herein. Each of the devices 22*a-c*, 24*a-c* may have a corresponding port that is physically coupled to switches of the SAN fabric used to implement the storage area network 60. The switches may be separately programmed by one of the devices 22*a-c*, 24*a-c* or by a different device (not shown). Programming the switches may include setting up specific zones that describe allowable data-path connections (which ports may form a data-path connection) and possible allowable initiator ports of those configurations. For example, there may be a zone for connecting the port of the host 22*a* with the port of the storage system 24*a*. Upon becoming activated (e.g., powering up), the host 22*a* and the storage system 24*a* may send appropriate signals to the switch(es) of the storage area network 60, and each other, which then allows the host 22*a* to initiate a data-path connection between the port of the host 22*a* and the port of the storage system 24*a*. Zones may be defined in terms of a unique identifier associated with each of the ports, such as such as a world-wide port name (WWPN).

Figure 4:
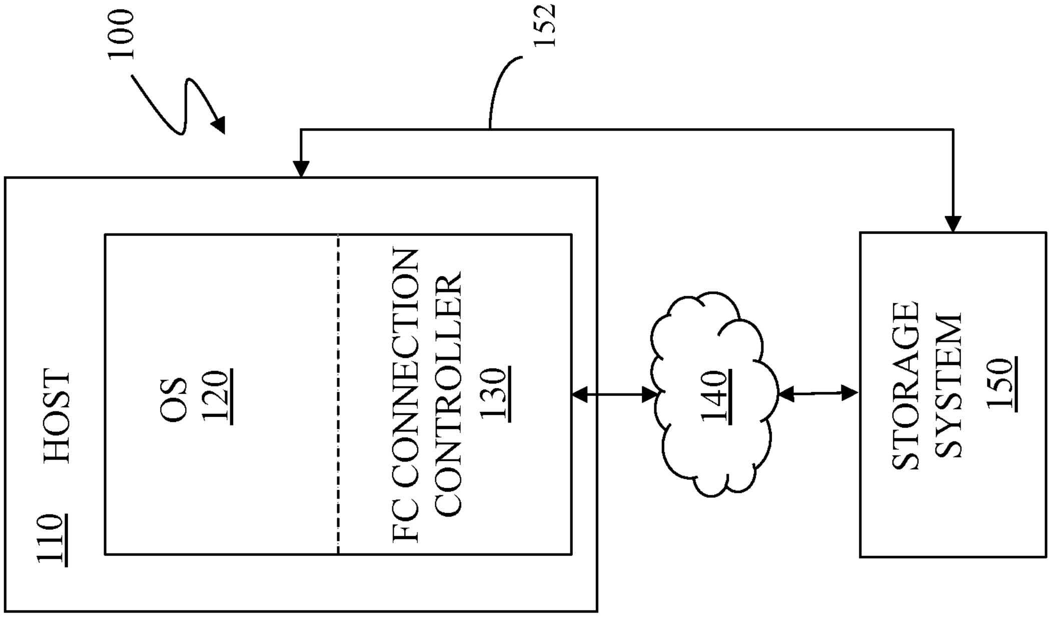
FIG. 4 is a schematic illustration showing a host system and a storage system according to an embodiment of the system described herein.

FIG. 4 is a diagram 100 showing a controller 130 for providing a communication connection between a host 110 and a storage system 150 according to an embodiment of the system described herein. The host 110 is similar to the hosts 22, 22', discussed above and the storage system 150 is similar to the storage systems 24, 26, discussed above. In an embodiment, the host 110 may be a computer running Linux, Windows, Mac OS, z/OS or some other appropriate operating system 120. The I/O processing on the host 110 may cooperate with a Fibre Channel controller 130 to enable I/O operations with the storage system 150. The controller 130 may send and receive data to and from the storage system 150 using a connection mechanism 140, that may include a network (such as the Internet, and appropriate connection thereof). The storage system 150 may include physical storage volumes and/or logical volumes and may be a storage array, such as Dell EMC Corporation's VMAX or Symmetrix data storage facility. The controller 130 may act as an I/O subsystem providing appropriate communication capability, such as ANSI FC-SB-3 Single-Byte Command Code Sets-3 Mapping Protocol for Fibre Channel. The storage system 150 may include features and/or components enabling communication with the host 110. For a discussion of features and implementations of storage system communications and suitable Fibre channel protocols operating therewith on z/Architecture computing systems, see J. Entwistle, "IBM System z10 FICON Express8 FCP Channel Performance Report," Technical paper, August 2009, 27 pp., which is incorporated herein by reference.

It is noted that various components of the system illustrated by the diagram 100 may be emulated. For further discussion of emulation of I/O computing components, see U.S. Pat. No. 9,665,502 to Jones et al., issued on May 30, 2017 and entitled "Virtual I/O Hardware" and U.S. Pat. No. 9,170,904 to LeCrone et al., issued on Oct. 27, 2015 and entitled "I/O Fault Injection Using Simulated Computing Environments," which are both incorporated herein by reference. Accordingly, in various embodiments, the system described herein provides for use of a channel emulator to emulate data transfer paths in I/O operations, and in which the channel emulator may simulate a host channel to provide I/O connectivity with an I/O device and may provide for the I/O connectivity using different channel protocols.

The connection mechanism 140 may provide Fibre Channel connectivity or may include an Internet connection and/or possibly some other types of connection(s). In an embodiment herein, the connection mechanism 140 may be directly incompatible with a Fibre Channel connection and/or conventional protocols used thereon. The incompatibility may be hardware incompatibility, software incompatibility, or both. Such connection mechanism 140 may not support a direct Fibre Channel connection but, instead, rely on an appropriate emulator for providing data in an appropriate format. It is further noted that where a Fibre Channel protocol emulation is being performed, the storage device 150 may include or be coupled to a corresponding Fibre Channel protocol emulator portion that may send and receive data to and from the connection mechanism 140 and also emulates, for example, a Fibre Channel FCO physical layer for the benefit of the storage device 150. Thus, in cases involving emulation, both the host 110 and the storage device 150 may operate as if the devices 110, 150 were communicating using a Fibre Channel hardware connection. In other embodiments, the connection mechanism 140 may be directly compatible with Fibre Channel communication and may be implemented using, for example, a Fibre Channel cable and/or a connection mechanism such as the SAN 60, discussed above.

The host 110 and the storage system 150 may be coupled directly using a high speed link 152, such as an optical cable. As described in more detail herein, the high speed link 152 may be used by the host 110 to access data in the storage system 150 and provide a direct synchronous data path that bypasses the significant amount of overhead associated with a Fibre Channel connection using asynchronous communication, such as ANSI FC-SB-3 Single-Byte Command Code Sets-3 Mapping Protocol for Fibre Channel communication. The host 110 may access data directly from cache memory of the storage system 150 using the high speed link 152 and protocols such as zHyperlink. In some instances, data accesses via the high speed link 152 may be supplemented by a Fibre Channel connection that may be used for initializing communication over the high speed link 152 and/or as a fallback for I/O operations that cannot be handled by the high speed link 152, such as I/O operations when there is a cache miss where the high speed I/O times out, as described in more detail elsewhere herein.

Figure 5:
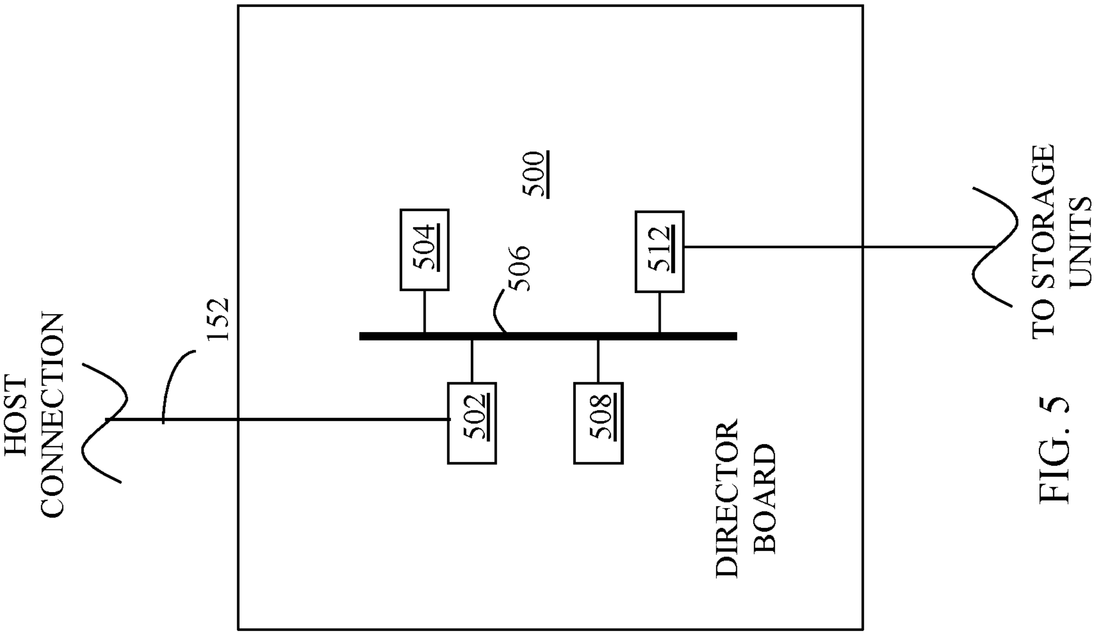
FIG. 5 is a schematic diagram of a director board having a smart network interface according to an embodiment of the system described herein.

Referring to FIG. 5, a director board 500 of the storage system 150 is shown in detail as including a connection component 502 coupled to the high speed link 152. The director board 500 includes a smart network interface controller 504 that communicates with the connection component 502 and possibly with other components of the storage system 150, as explained in more detail elsewhere herein. The connection component 502 provides connectivity between the host 110 and the storage system 150 via the high speed link 152. In an embodiment herein, the smart network interface controller 504 is a LimeStoneDX SLIC running a PCI PEX8733 Draco chip from Broadcom Corporation of San Jose, Calif., although other appropriate smart network interface devices could be used instead, including devices provided by other vendors such as Eternity Networks, Marvel, Napatech/Intel, Netronome, Solarflare, and Huawei. The smart network interface controller 504 includes a system on a chip having a processor, memory, non-volatile storage, etc. where the processor may be programmed in a conventional manner to provide significant functionality, including the functionality described herein.

Communication between the connection component 502 and the smart network interface controller 504 may be provided by a PCIe bus 506 that also provides communication for other components of the director board 500, including a processor 508 and a disk interface 512. Note that it is possible to use one or more different mechanisms to provide communication for the components of the director board, including any appropriate on-board interconnection bus or fabric, such as Gen-Z. There may be other components on the director board 500 (not shown), such as one or more additional processors, non-volatile memory, RAM, etc. The disk interface 512 controls/accesses one or more of the physical storage units of the storage system 150 (like the physical storage units 33*a*-33*c* of the storage system 24, described above) by exchanging control/status information and data therewith.

Data that is exchanged between the host 110 and the storage system 150 passes through the connection component 502, the smart network interface controller 504 and the disk interface 512 to be stored on and read from the physical storage units of the storage device 150. In some embodiments, the processor 508 is used to read and write data from and to the smart network interface controller 504 and the connection component 502. Thus, for example, data that is received from the host 110 is passed from the connection component 502 to the smart network interface controller 504 and is then read from the smart network interface controller 504 by the processor 508 that transfers the data to the disk interface 512. The disk interface 512 transfers the data to the storage units of the storage system 150. In other embodiments, a P2P (PCIe peer copy) transfer is initiated between the smart network interface controller 504 and the disk interface 512. The P2P transfer allows data to be transferred directly between the smart network interface controller 504 to the disk interface 512 without using the processor 508 (or any other processor). Other types of direct data transfer between the smart network interface controller 504 and the disk interface 512 may also be used.

Figure 6:
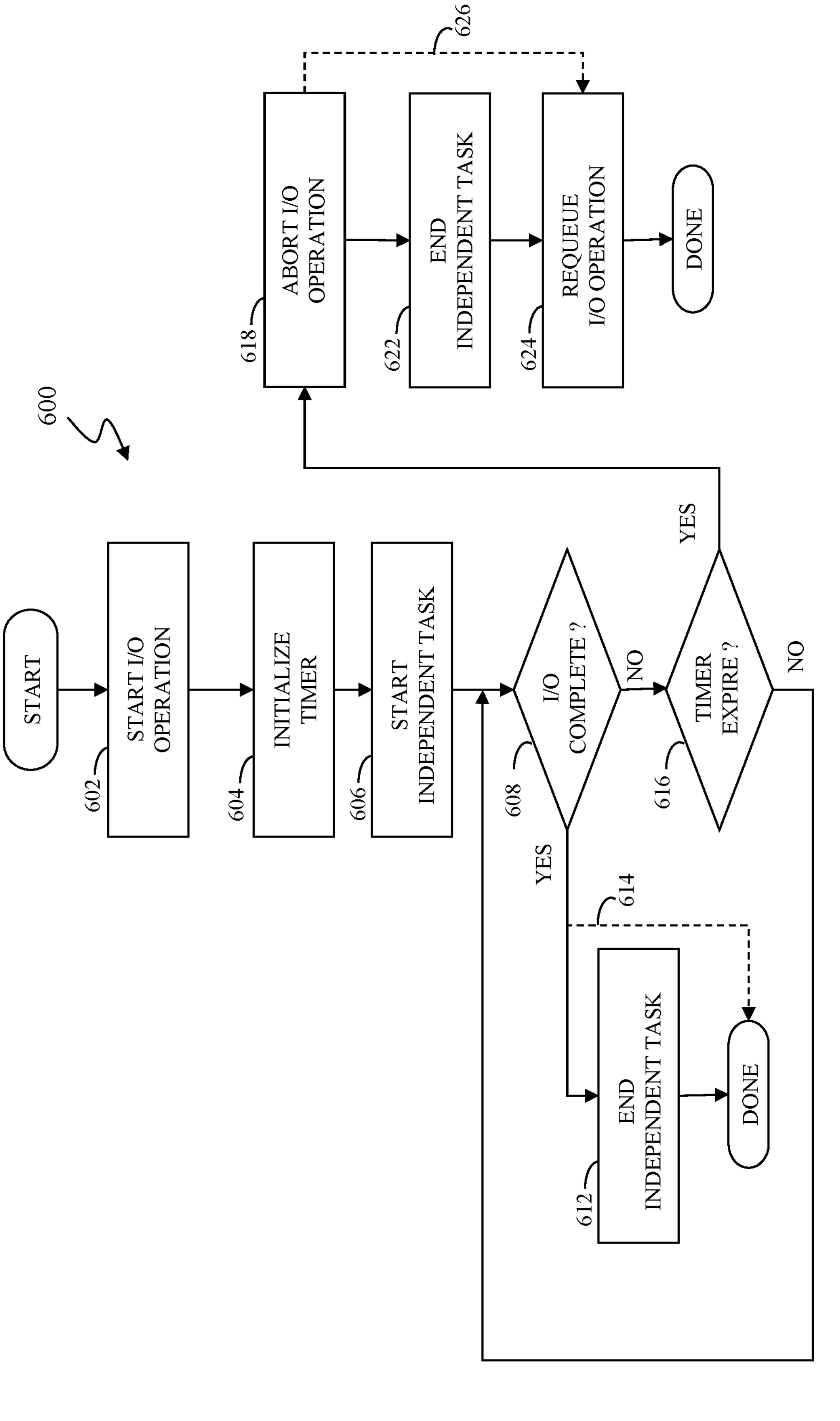
FIG. 6 is a flow diagram illustrating processing performed in connection with running an independent task during a synchronous I/O operation according to an embodiment of the system described herein.

Referring to FIG. 6, a flow diagram 600 illustrates processing performed in connection with performing an I/O operation using the high speed link 152. Processing begins at a step 602 where an I/O operation is started using, for example, components of the director board 500, including the connection component 502 and the smart network interface controller 504. Following the step 602 is a step 604 where a timer is initialized. The timer is used to limit an amount of time used for the I/O operation. If the I/O operation via the high speed link 152 has not completed by the time the timer expires, the I/O operation is aborted and then an asynchronous I/I with the same data is requeued using an alternative mechanism, such as performing an asynchronous I/O operation with the same data via the Fibre Channel connection 140.

Following the step 604 is a step 606 where a task that is independent from the I/O operation is started. The task may be provided from a high priority work queue that represents small units of non-interruptible work that can be quickly dispatched, with little to no state data to save, while waiting for the I/O via the high speed link 152 to complete. The independent tasks in the work queue are designed to run for an amount of time that is generally less than an amount of time needed for completion of a synchronous I/O operation via the high speed link 152. The independent tasks thus consume what would otherwise be wasted CPU cycles. In some cases, there may be throttling thresholds applied to the independent tasks to control how long the independent tasks are allowed to run. There may also be restrictions on the complexity allowed for the independent tasks. An example of a possible independent task is a task that performs health checks of system structures that essentially run through real memory checking for integrity. Other examples include cryptocurrency operations, such as Bitcoin mining. Note that the independent task may be completely independent of the synchronous I/O operation being performed.

Following the step 606 is a test step 608 where it is determined if the I/O operation via the high speed link 152 has completed (i.e., the director board 500 has generated a status result indicating that data for the I/O has been successfully transmitted or received). If the I/O operation has completed, then control transfers from the step 608 to a step 612 where the independent task, which was started at the step 606, is terminated. Following the step 612, processing is complete. Note that, in some embodiments, it is possible that the independent tasks are constructed to always take less time than an I/O operation using the high speed link 152. In those embodiments, it may not be necessary to explicitly terminate the independent task. This is illustrated by an alternative path 614 included with the flow diagram 600.

If it is determined at the test step 608 that the I/O operation is not complete, then control transfers from the test step 608 to a test step 616 where it is determined if the timer that was initialized at the step 604, discussed above, has expired. If not, then control transfers back to the step 608, discussed above, for another iteration. Otherwise, control transfers from, the step 616 to a step 618 where the I/O operation via the link 152 is aborted. Following the step 618 is a step 622 where the independent task is ended. Following the step 622 is a step 624 where an I/O operation with the same data is requeued using an alternative mechanism, such as performing an asynchronous I/O operation with the same data via the Fibre Channel connection 140. Following the step 624, processing is complete. Note that, in some embodiments, it is possible that the independent tasks are constructed to always take less time than an I/O operation using the high speed link 152, and thus less time that the timer that is initialized at the step 604. In those embodiments, it may not be necessary to explicitly terminate the independent task at the step 622. This is illustrated by an alternative path 626 included with the flow diagram 600.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of running an independent task in connection with a synchronous I/O operation between a storage system and a host, comprising:

starting the synchronous I/O operation;

setting a timer for the synchronous I/O operation;

starting the independent task that runs while waiting for completion of the synchronous I/O operation, wherein the independent task is ended in response to one of: the timer expiring or the I/O operation completing; and aborting the synchronous I/O operation in response to the timer expiring prior to completion of the synchronous I/O operation.

2. A method, according to claim 1, wherein the synchronous I/O operation is performed using an optical cable connection between the storage system and the host.

3. A method, according to claim 2, wherein the optical cable connection is coupled to a smart network interface controller provided on a director board in the storage system.

4. A method, according to claim 3, wherein the smart network interface controller includes a system on a chip having a processor, memory, and non-volatile storage.

5. A method, according to claim 4, wherein the smart network interface controller is a LimeStoneDX SLIC running a PCI PEX8733 Draco chip from Broadcom Corporation of San Jose, Calif.

6. A method, according to claim 1, further comprising:

performing an asynchronous I/O operation using data that was used for the synchronous operation in response to the timer expiring prior to completion of the synchronous I/O operation.

7. A method, according to claim 6, wherein the asynchronous I/O operation is performed using an alternative connection between the host and the storage system.

8. A method, according to claim 7, wherein the alternative connection is a Fibre Channel connection.

9. A non-transitory computer readable medium containing software that runs an independent task in connection with a synchronous I/O operation between a storage system and a host, comprising:

executable code that starts the synchronous I/O operation;

executable code that sets a timer for the synchronous I/O operation;

executable code that starts the independent task that runs while waiting for completion of the synchronous I/O operation, wherein the independent task is ended in response to one of: the timer expiring or the I/O operation completing; and executable code that aborts the synchronous I/O operation in response to the timer expiring prior to completion of the synchronous I/O operation.

10. A non-transitory computer readable medium, according to claim 9, wherein the synchronous I/O operation is performed using an optical cable connection between the storage system and the host.

11. A non-transitory computer readable medium, according to claim 10, wherein the optical cable connection is coupled to a smart network interface controller provided on a director board in the storage system.

12. A non-transitory computer readable medium, according to claim 11, wherein the smart network interface controller includes a system on a chip having a processor, memory, and non-volatile storage.

13. A non-transitory computer readable medium, according to claim 12, wherein the smart network interface controller is a LimeStoneDX SLIC running a PCI PEX8733 Draco chip from Broadcom Corporation of San Jose, Calif.

14. A non-transitory computer readable medium, according to claim 9, further comprising:

executable code that performs an asynchronous I/O operation using data that was used for the synchronous operation in response to the timer expiring prior to completion of the synchronous I/O operation.

15. A non-transitory computer readable medium, according to claim 14, wherein the asynchronous I/O operation is performed using an alternative connection between the host and the storage system.

16. A non-transitory computer readable medium, according to claim 15, wherein the alternative connection is a Fibre Channel connection.

17. A computer system, comprising:

a processor;

a controller, coupled to the processor, that communicates with a storage system coupled to the computer system;

a non-transitory computer readable medium coupled to the processor and the controller and containing software that runs an independent task in connection with a synchronous I/O operation between the storage system and the computer system, the software including executable code that starts the synchronous I/O operation, executable code that sets a timer for the synchronous I/O operation, executable code that starts the independent task that runs while waiting for completion of the synchronous I/O operation, wherein the independent task is ended in response to one of: the timer expiring or the I/O operation completing, and executable code that aborts the synchronous I/O operation in response to the timer expiring prior to completion of the synchronous I/O operation.

18. A computer system, according to claim 17, wherein the synchronous I/O operation is performed using an optical cable connection between the storage system and the host.

19. A computer system, according to claim 18, wherein the optical cable connection is coupled to a smart network interface controller provided on a director board in the storage system.

20. A computer system, according to claim 19, wherein the smart network interface controller includes a system on a chip having a processor, memory, and non-volatile storage.

21. A computer system, according to claim 17, wherein the software also includes executable code that uses the controller to perform an asynchronous I/O operation with data that was used for the synchronous operation in response to the timer expiring prior to completion of the synchronous I/O operation.

* * * * *

UNITED STATES PATENT AND TRADEMARK OFFICE

CERTIFICATE OF CORRECTION

PATENT NO. : 11,748,031 B2
APPLICATION NO. : 17/234380
DATED : September 5, 2023
INVENTOR(S) : Douglas E. LeCrone et al.

It is certified that error appears in the above-identified patent and that said Letters Patent is hereby corrected as shown below:

In the Claims

Column 9, Line 67:
In Claim 5, the phrase "San Jose, Calif" should read -- San Jose, California --

Column 10, Line 41:
In Claim 13, the phrase "San Jose, Calif" should read -- San Jose, California --

Signed and Sealed this
Twenty-fourth Day of October, 2023

Katherine Kelly Vidal

Katherine Kelly Vidal
*Director of the United States Patent and Trademark Office*